United States Patent
Assaad et al.

(10) Patent No.: US 9,564,170 B2
(45) Date of Patent: Feb. 7, 2017

(54) FLEX OVER SUSPENSION FAULT DETECTION UNDER A WRITE GATE FOR MAGNETIC DISK DRIVES

(71) Applicant: Texas Instruments Incorporated, Dallas, TX (US)

(72) Inventors: Rida S. Assaad, Murphy, TX (US); William M. Torres Escajadillo, Allen, TX (US); Mark A. Wolfe, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 15/067,636

(22) Filed: Mar. 11, 2016

(65) Prior Publication Data
US 2016/0267938 A1     Sep. 15, 2016

Related U.S. Application Data

(60) Provisional application No. 62/131,412, filed on Mar. 11, 2015, provisional application No. 62/273,950, filed on Dec. 31, 2015.

(51) Int. Cl.
*G11B 5/09*     (2006.01)
*G11B 20/18*    (2006.01)

(52) U.S. Cl.
CPC ...... *G11B 20/18* (2013.01); *G11B 5/09* (2013.01)

(58) Field of Classification Search
None
See application file for complete search history.

(56) References Cited

U.S. PATENT DOCUMENTS

| | | | | |
|---|---|---|---|---|
| 4,571,575 A | * | 2/1986 | McCullough | G11B 20/1426 341/59 |
| 5,414,722 A | * | 5/1995 | Tollum | G11B 5/09 360/45 |
| 6,516,443 B1 | * | 2/2003 | Zook | G11B 20/10009 714/792 |
| 2007/0164881 A1 | * | 7/2007 | Schwartz | H03M 5/145 341/50 |
| 2011/0083054 A1 | * | 4/2011 | Ozdemir | G11B 20/1403 714/752 |
| 2016/0267938 A1 | * | 9/2016 | Assaad | G11B 5/09 |

* cited by examiner

*Primary Examiner* — Peter Vincent Agustin
(74) *Attorney, Agent, or Firm* — Lawrence J. Bassuk; Charles A. Brill; Frank D. Cimino (57) ABSTRACT

A system and method for Flex Over or On Suspension (FOS) fault detection under a write gate for magnetic disk drives may employ a flex over suspension fault comparator that compares a predetermined reference threshold to a positive delta of a disk drive write head data stream and outputs a positive or negative FOS fault indication. A max/min buffer detects polarity of a disk drive read/write head and applies a positive buffered delta to the fault comparator. A transition-free window detector triggers the fault comparator to output the fault indication when a transition-free window of zero-value data bits of a predetermined length is detected from the disk drive head, and the transition-free window detector provides a fault validation signal to validate output of the fault comparator when the transition-free window of zero-value data bits of the predetermined length is detected from the disk drive head.

20 Claims, 8 Drawing Sheets

FLEX OVER SUSPENSION FAULT DETECTION UNDER A WRITE GATE FOR MAGNETIC DISK DRIVES

CROSS-REFERENCE TO RELATED APPLICATIONS

The present application claims the benefit of the filing date of U.S. Provisional Patent Application Ser. No. 62/108,885, entitled Flex Over Suspension Fault Detection Under Write Gate for Magnetic Disk Drives, filed Mar. 11, 2015, and U.S. Provisional Patent Application Ser. No. 62/273,950, entitled Flex Over Suspension Fault Detection Under a Write Gate for Magnetic Disk Drives, filed Dec. 31, 2015, both of which are incorporated herein in their entirety by reference.

TECHNICAL FIELD

Embodiments of this disclosure are directed, in general, to magnetic disk drives and, more specifically, to Flex Over (or On) Suspension (FOS) fault detection under a write gate for magnetic disk drives.

BACKGROUND

Magnetic disc drives may utilize a Flex Over (or On) Suspension (FOS) circuit to couple a preamp or the like to read-write head assemblies. An FOS assembly may be routed along an actuator assembly and may be supported on a read-write head suspension assembly. The FOS assembly may comprise a pair of electrically insulating plastic layers which encapsulate two separate pairs of conductors, which transmit write currents and read bias currents, to the write and read elements of the head assembly. The conductors may interconnect from a preamp to the read write heads. Transitory effects may exist for impedance becomes greater due to cracks in the conductors. FOS fault detection may be required to ensure a poor FOS connection does not exist in the head assembly. Writer open fault detectors, or the like, look for opens that are on the scale of kilohms (kΩs), while poor FOS connection-based faults may occur in the 20Ω to kΩs range.

Figure 1:
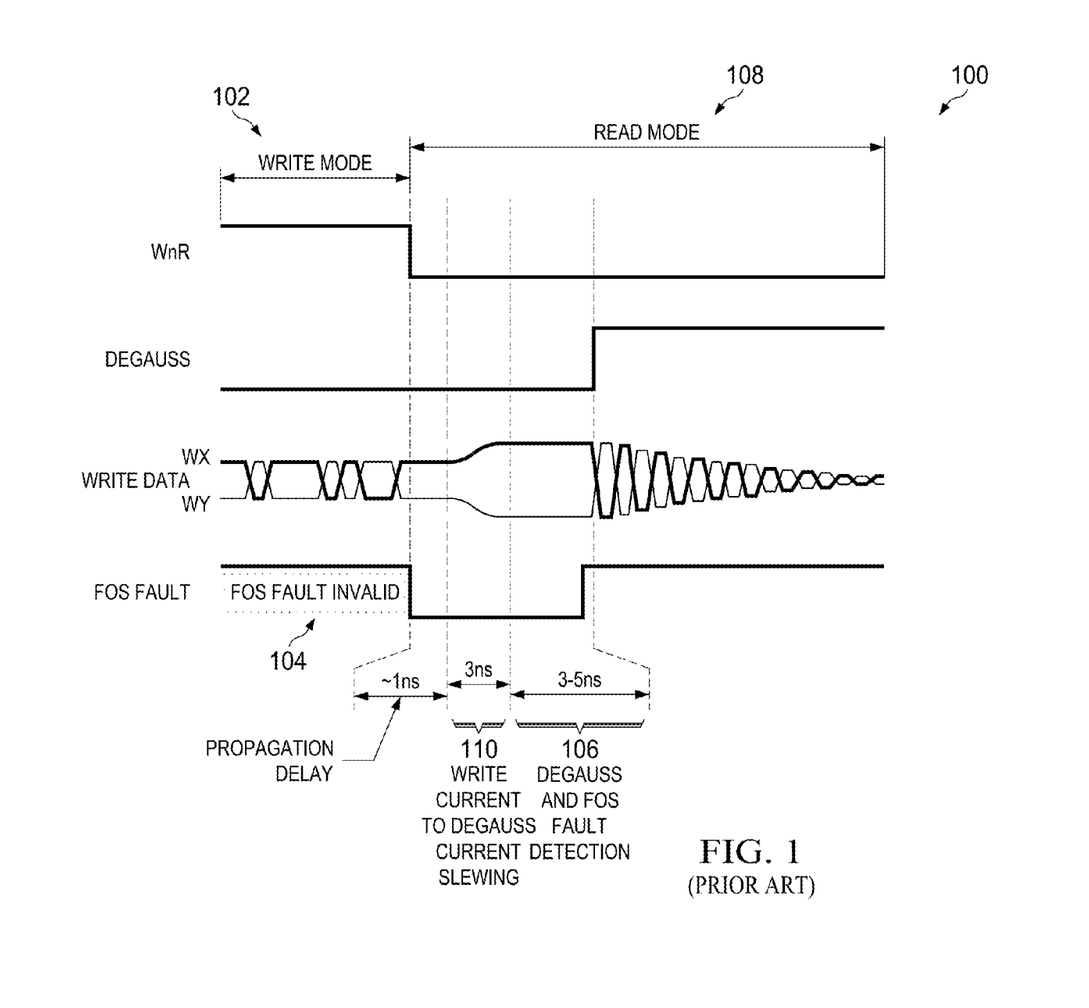
FIG. 1 is a diagrammatic waveform illustration of prior art Flex Over (or On) Suspension (FOS) fault detection.

In existing FOS fault detection, the FOS fault is detected, by way of example, approximately 8 ns after entering read mode and prior to degauss (i.e. after the read/write head slews from write current to degauss current, degauss is enabled and the FOS fault detection is performed) and when enabled, this fault delays the entire writer degauss function and reader turn-on by 3 ns in such an example, resulting in a 60% time penalty. This is demonstrated in FIG. 1, which is a diagrammatic waveform illustration of example prior art FOS fault detection 100. Therein, when a FOS fault is detected, and despite its immediate entry to the fault register, the fault is not reported until the following write cycle (mode) is entered. Thus, the previous complete write cycle 102 was potentially performed with an existing FOS fault 104 that is only detected at 106, during read cycle 108. There is an inherent sensitivity in existing FOS fault detection, such as when the end user opts to use a different degauss write current than what was used in the previous write cycle. The prior art waveform example of FIG. 1 shows an allotted time at 110 for this slewing to occur, and a magnitude delta between write and degauss currents, along with the polarity of slewing, leave a significant margin for error in existing FOS fault detection.

SUMMARY OF THE INVENTION

Aspects of the present systems and methods provide an implementation of a method of Flex Over or On Suspension (FOS) fault detection calls for writing a plurality of zero-value bits as a transition-free data stream window by an idle write head of a magnetic disk drive that employs flex-over or on-suspension circuitry, such as by employing run length limited data coding. A polarity of terminals of the write head are detected and a positive delta representation of an absolute differential across the terminals of the write head is generated. The positive delta representation is measured with respect to a predetermined threshold indicative of a poor flex over or on suspension connection by a fault comparator. The resulting measurement is amplified and converted to a corresponding digital value by the fault comparator.

The fault comparator is triggered in response to detection of a transition-free window of a predetermined length and outputs the digital value as a positive or negative indication of a fault in response to triggering and provides a fault validation signal to validate output of the fault comparator, in response to the detection of the transition-free window of a predetermined length. This predetermined length of the transition-free window is based on a length to allow the fault comparator to settle. The fault validation signal is provided to validate the output of the fault comparator whether the output of the fault comparator is positive or negative.

The write head is in write mode during writing the plurality of zero-value bits, detecting the polarity of the write head, generating the positive delta representation, measuring the positive delta representation with respect to the predetermined threshold, amplifying and converting the measurement, triggering the fault comparator, outputting the positive or negative indication of a fault, and providing the fault validation signal. However, a write cycle of the write head may be interrupted in response to a positive indication of a fault and the fault validation signal, but a media degauss of the magnetic disk drive may proceed in response to a negative indication of a fault and the fault validation signal. In contrast, conventional writer fault detection may be initiated during a next read cycle in response to failure to detect a transition-free window of a predetermined length during a write cycle.

Thus, a flex over or on suspension fault detection under write gate apparatus for magnetic disk drives may include a maximum-minimum buffer configured to detect a write head polarity, to generate a positive delta representation of an absolute differential across terminals of the write head using the polarity, and to apply the positive buffered delta representation to a flex over suspension fault comparator. This fault comparator may be configured to measure the positive delta representation of the absolute differential across the terminals of the write head with respect to a predetermined threshold indicative of a poor flex over or on suspension connection, to amplify and convert a resulting measurement to a corresponding digital value, and to output the digital value as a positive or negative indication of a fault. A transition-free window detector may be configured to trigger the fault comparator to output the fault indication when a transition-free window of zero-value data bits of a predetermined length is detected from the disk drive head, and to provide a fault validation signal, whether the output of the fault comparator is a positive or negative fault indication, to validate output of the fault comparator when the transition-free window of zero-value data bits of the predetermined length is detected from the disk drive head. The maximum-minimum buffer, the flex over suspension fault comparator and/or the transition-free window detector may be at least part of an integrated circuit.

BRIEF DESCRIPTION OF THE DRAWINGS

Having thus described the present systems and methods in general terms, reference will now be made to the accompanying drawings, wherein:

DETAILED DESCRIPTION

The techniques of this disclosure now will be described more fully hereinafter with reference to the accompanying drawings. These techniques of this disclosure may, however, be embodied in many different forms and should not be construed as limited to the embodiments set forth herein. Rather, these embodiments are provided so that this disclosure will be thorough and complete, and will fully convey the scope of this disclosure to those skilled in the art. One skilled in the art may be able to use the various embodiments described herein.

As noted, typical Flex Over (or On) Suspension (FOS) writer open fault detectors, or the like, detect circuit opens that are on the scale of kilohms (kΩs). The present systems and methods are configured to determine if there is a poor FOS connection in the 20Ω to kΩs range. As noted, in prior FOS fault detection, an FOS fault is detected approximately 8 ns after entering read mode and when enabled, this fault delays the entire writer degauss function and reader turn-on by 3 ns, a 60% time penalty, as demonstrated in example prior art FIG. 1.

Figure 2:
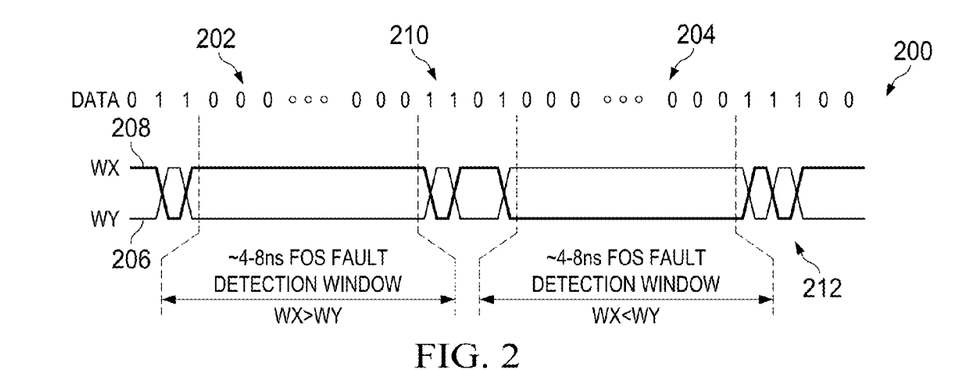
FIG. 2 is a diagrammatic illustration of insertion of runs of zeroes (0) before a one (1) is written, in accordance with some embodiments of the present systems and methods.

In accordance with embodiments of the present systems and methods, real-time FOS fault detection is implemented under a write gate to reduce or eliminate this time penalty. The present systems and methods employs Run Length Limited (RLL) data coding used in subject magnetic disk drives, whereby a run of zeroes (0) before a one (1) is written. FIG. 2, is a diagrammatic illustration of insertion 200 of runs 202 and 204 of zeroes, by write head terminals 206 and 208, before one or more ones are written by the write head at 210 and 212, in accordance with some embodiments. In particular, FIG. 2 shows two example transition-free windows at 202 and 204 with opposite write data polarities used in accordance with embodiments of the present systems and methods, as discussed below.

Compared to the previous architecture, embodiments of the present systems and methods incorporate a maximum/minimum (max/min) buffer that detects the polarity of terminals of the write head, measures the write head differential with respect to a predetermined threshold, and applies a corresponding buffered delta to a fault comparator. Moreover, a window detector is employed to trigger the fault comparator when a sufficiently long transition-free window is found to allow for the comparator input to settle, and provides a "fault-valid" signal to validate the FOS fault comparator output, be it positive or negative.

Figure 3:
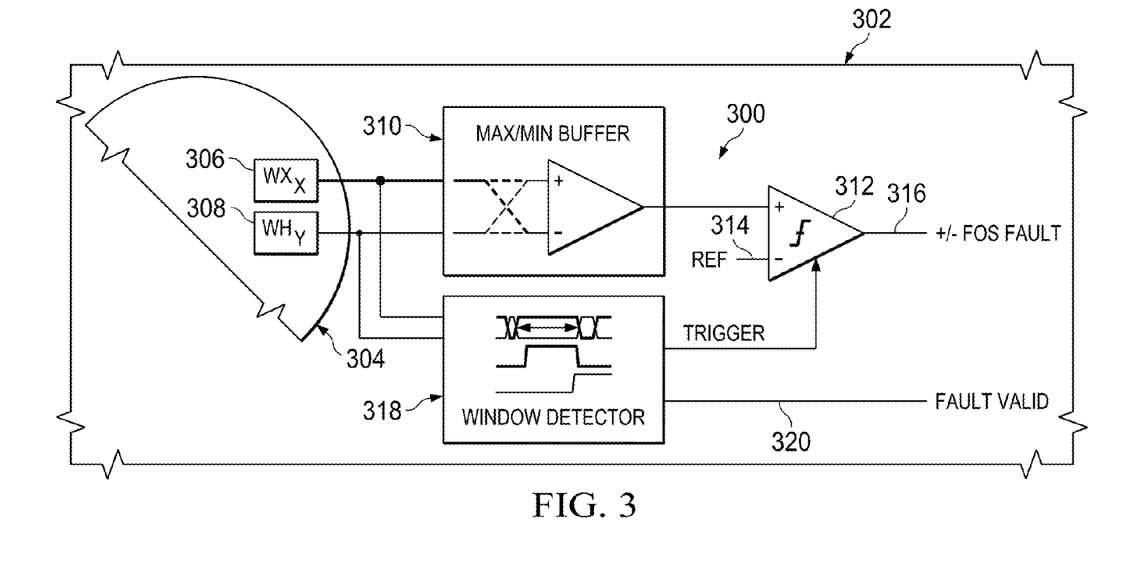
FIG. 3 is a high-level diagrammatic illustration of an embodiment of a system for implementation of FOS fault detection, under a write gate, for magnetic disk drives, in accordance with embodiments of the present systems and methods.

FIG. 3 is a high-level diagrammatic illustration of example embodiment 300 of a system for implementation of FOS fault detection, under a write gate, for magnetic disk drives in accordance with embodiments of the present systems and methods. System 300 may be implemented as an integrated circuit (IC) or other apparatus, employed in magnetic disk drive 302 (a hard disk drive) in conjunction with a read/write head configured to write data to media 304 (e.g. the drive hard disk). Herein, such a read/write head, with terminals 306 and 308, may be referred to herein as "write head" when the disk drive, or at least the subject read/write head(s), are in write mode. In implementation of embodiments of the present systems and methods, disk drive 302 may employ RLL data coding to write a plurality of zero-value bits (i.e. same-value bits) as transition-free windows of zero-value data bits (202, 204) when idle.

In illustrated apparatus embodiment 300, max/min buffer 310 detects the applied polarity of the write head according to the orientation of its terminals 306 and 308 and applies a positive buffered delta representing the absolute write head differential to fault comparator 312. In particular, a determination may be made as to whether a write head differential has been detected that is greater than or less than a predetermined write head differential threshold. This predetermined threshold of the write head differential may be indicative of a level of impedance across the write head terminals 306 and 308, such as may be indicative of a FOS fault, which may be the result of a poor FOS connection, or the like. Max/min buffer 310 isolates the signal from the input (i.e. write head terminals 306 and 308) and amplifies the signal. Existing FOS fault detectors require a particular write head terminal polarity. However, the present systems and methods are polarity-neutral, in that detection occurs regardless of polarity due to the polarity detection provided by max/min buffer 310, which detects a current flow in either direction, and hence irrespective of polarity. Comparator 312 is configured to compare a predetermined write head threshold provided via reference 314 to the positive buffered delta provided via max/min buffer 310 and to output a positive or negative fault indication 316 in a digital form. The reference signal provided via 314 may be a representation of a detection threshold, such as a minimum threshold for a poor FOS connection, which by way example employed herein may be 20Ω. In particular implementations, the reference may be a gained reference of the write current used to magnetize the head for data writing.

Transition-free window detector 318 is employed to trigger fault comparator 312 when a sufficiently long transition-free window (202 or 204) is found to allow for the comparator input to settle. To this end, the window length may be selectable, such as providing a manufacturer, user, installer or the like an option to define a triggering transition-free window length, using, by way of example, four to six settings, for a four to eight ns transition-free window, such as depending upon write speed of the disk drive. Further, the (maximum) length of the transition-free window may be governed, at least in part by a RLL coding zero-bit write limit, thereby governing, at least in part the length of time of the transition-free window. Existing FOS fault detection is performed after a write cycle, at the beginning of a read cycle, employing degauss current in the read/write head, which may be unsettled. Hence, by performing FOS fault detection during the write cycle, as well as employing a transition free window of a sufficiently long duration, the present systems and methods further ensure that the signal used for detection is settled. This settling may be based on a speed of the circuitry implementing the present stems and methods and on the monitored data stream rate, permitted under the applicable a RLL coding zero-bit write limit. Window detector 318 also provides fault-valid signal 320 (i.e. a fault validation signal) to validate FOS fault-condition 316 output from comparator 312, whether FOS fault output condition 316 indicates a fault (is positive) or indicates there is no fault (is negative). This fault validation signal is provided in response to detection of the transition-free window of the predetermined length, as well. Thus, although a circuit embodying the present systems and methods is active (i.e. on) anytime the disk drive is writing, it will not trigger a fault indication unless a transition-free window is open. However, the present stems and methods are working in the background and perform fault detection without waiting for data transition to be completed.

Figure 4:
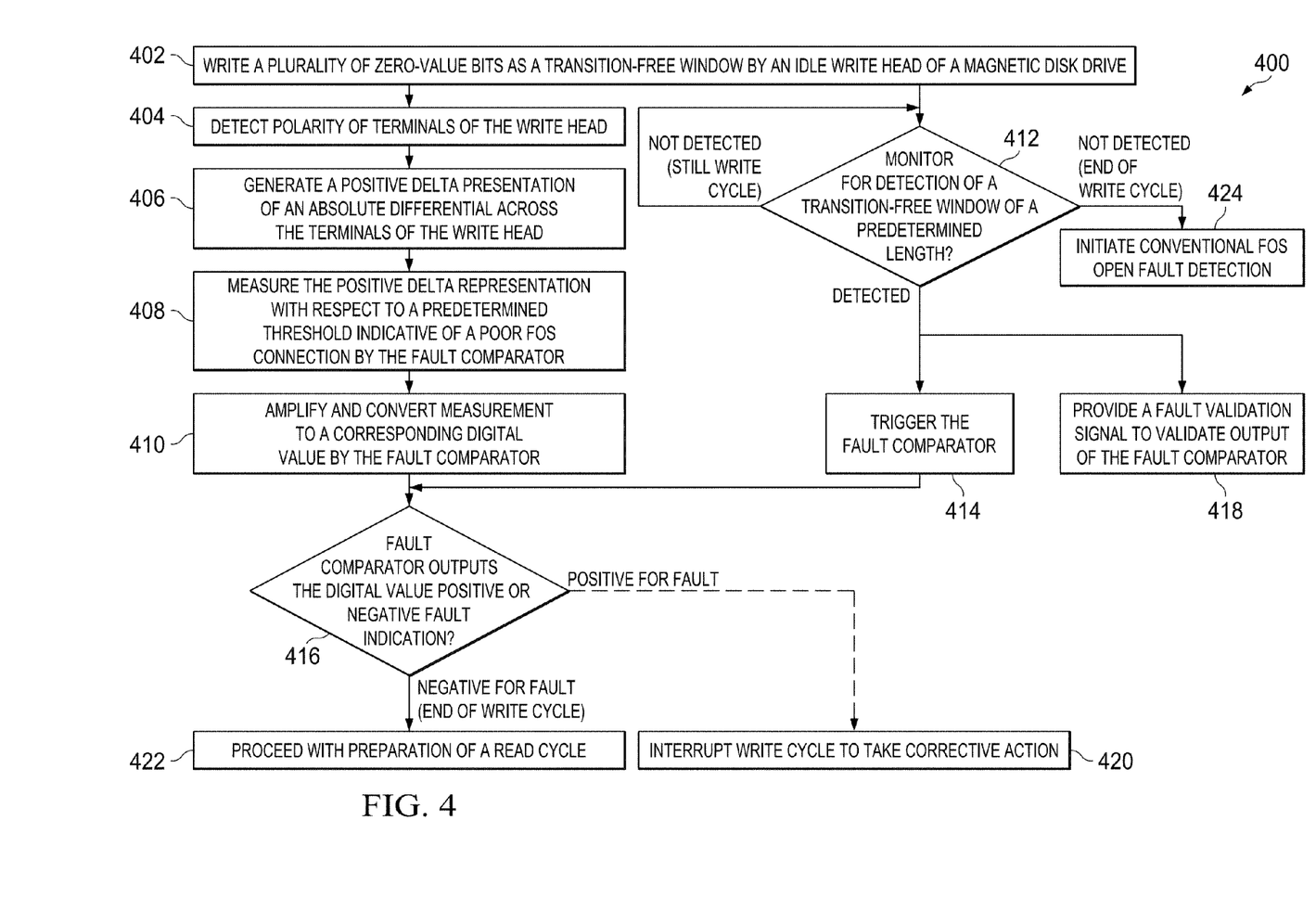
FIG. 4 is a flowchart of an example implementation of flex over or on suspension fault detection under a write gate for magnetic disk drives, in accordance with some embodiments.

FIG. 4 is a flowchart of example implementation 400 of flex over or on suspension fault detection under a write gate for magnetic disk drives, in accordance with some embodiments. Therein, at 402, a plurality of zero-value bits (i.e. same-value bits) are written as a transition-free data stream window (202, 204) by an idle write head (306, 308) of a magnetic disk drive (302) that employs flex-over or on-suspension circuitry. As, noted, the magnetic disk drive may employ RLL data coding to write the transition-free data stream of zero-value bits. The length of this predetermined length of the transition-free window may be based on a length that allows the fault comparator to settle.

The absolute write head differential is buffered and measured with respect to a predetermined write head differential threshold across the inputs of a fault comparator. Hence, at 404, a polarity of terminals of the write head is detected, such as by a max/min buffer (310), such as when the write head (306, 308) transitions from writing a zero bit to writing a one bit. In particular, a determination may be made at 404 as to whether a write head differential has been detected that is greater than or less than a predetermined write head differential threshold. This predetermined threshold of the write head differential may be indicative of a level of write head impedance, such as may indicative of a FOS fault, which may be the result of a poor FOS connection, or the like.

At 406 a positive delta representation of an absolute differential across the terminals of the write head is generated. For example, in some embodiments in response to detection of a change in polarity of the write head at 404, that is detection of a write head differential is greater than the predetermined threshold, the max/min buffer (310) applies a positive delta to a fault comparator (312) at 406 to generate the positive delta representation of an absolute differential across the terminals of the write head. That is, generating the positive delta representation of the differential across the terminals of the write head to the comparator, irrespective of the polarity orientation of the write head terminals and current flow. Otherwise, such as in response to detection of a write head differential that is less than the predetermined threshold, monitoring for a change in write head polarity continues. This polarity auto-detect and buffer functionality improves signal strength, compared to existing systems for FOS writer detection, which in turn improves FOS fault detection accuracy.

At 408, the positive delta representation of the absolute differential across the terminals of the write head is measured with respect to a predetermined threshold indicative of a poor flex over or on suspension connection, such as by the fault comparator (312). The fault comparator then amplifies and converts the delta applied across the inputs to a corresponding digital value and outputs a positive or negative indication of a fault. For example, at 410, the resulting measurement of the positive delta representation of the absolute differential across the terminals of the write head with respect to the predetermined absolute differential threshold indicative of a poor flex over or on suspension connection is amplified and converted a by the fault comparator to a corresponding digital value.

The fault comparator output is triggered in response to detection of a transition-free window of a predetermined length to compare a predetermined reference threshold to the positive delta and output a positive or negative indication of a fault. For example, at 412, a transition-free window detector (318) concurrently monitors the bit stream for detection of a transition-free window of (zero) bits of a predetermined length (202, 204). If a transition-free window of bits of a predetermined length is detected at 412 the fault comparator (312) is triggered at 414, otherwise, monitoring the bit stream for detection of a transition-free window of (zero) bits of a predetermined length continues. Following triggering of the fault comparator, at 414, the fault comparator outputs the digital value (from 410) as a positive or negative indication of a fault (314), at 416, such as in response to comparing a predetermined reference threshold to the positive delta (and 408). At 418 the window detector (318) provides (i.e. outputs) a fault validation signal (318) to validate output of the fault comparator from 416, regardless of whether the output of the fault comparator is positive or negative. As noted, this fault validation signal is provided at 416 in response to detection of the transition-free window of the predetermined length at 412.

During steps 402 through 418, the magnetic disk drive, or at least the subject write head, are in write mode. That is, while: writing the plurality of zero-value bits at 402; detecting the polarity of terminals of the write head at 404, generating, measuring amplifying and converting the positive delta at 406 through 410; monitoring for and detection of a transition-free window at 412; triggering the fault comparator at 414; outputting the positive or negative indication of a fault at 416; and providing the fault validation signal at 418; the magnetic disk drive, or at least the write head that wrote the transition free window are in write mode. Thereby, in accordance with the present systems and methods, a write cycle of the magnetic disk drive, or at least the subject write head may be interrupted at 420 in response to a positive indication of a fault at 416 and the fault validation signal from 418, to take appropriate corrective action, such as repeating the (previous) write process. Hence, in accordance with embodiments of the present systems and methods FOS faults are detected while in write mode and they are reported sooner, which in turn, enables (an (end user) option) to interrupt the write cycle, if necessary, to take the appropriate action, as noted. Conversely, in response to a negative indication of a fault at 416 (i.e. an indication that no FOS fault exists) and the fault validation signal from 418, degauss of the magnetic disk drive media may proceed at 422 in preparation of a read cycle, such as by degaussing the media, etc. Implementation of the present systems and methods for FOS fault detection during the write mode avoids any comparator sensitivity to the write current slewing from a write setting to degauss setting (110), since the write current remains constant while in write mode.

Embodiments of the present FOS fault detection systems and methods incorporate several facets not present in prior FOS fault detection. For example, the present systems and methods are able to detect the fault while in write mode, are able to detect the write current polarity, and are insensitive to slewing from write current to degauss current. Further, the present systems and methods use real write data patterns, making use of RLL allowed data windows with no need to include any overhead for customized or specific write data patterns.

The present system and method embodiments eliminate the time penalty required before media degauss is performed at the beginning of read mode, thus eliminating formatting overhead, eliminate comparator sensitivity to the write current slewing from a write setting to a degauss setting as the write current remains constant while in write mode. However, embodiments of the present systems and methods may be implemented so as to maintain the functionality of predecessor systems and methods for FOS writer detection should a sufficiently long transition-free window not be detected during a write cycle. Thusly, in response to a failure to detect a transition-free window of a predetermined length at 412 during a write cycle, and hence insufficient time for comparison at 416, conventional writer FOS fault detection (106) may be initiated at 424 by the window detector upon initiation of read mode by the hard disk drive for at least the subject read/write head, prior to media degaussing.

Figure 5A:
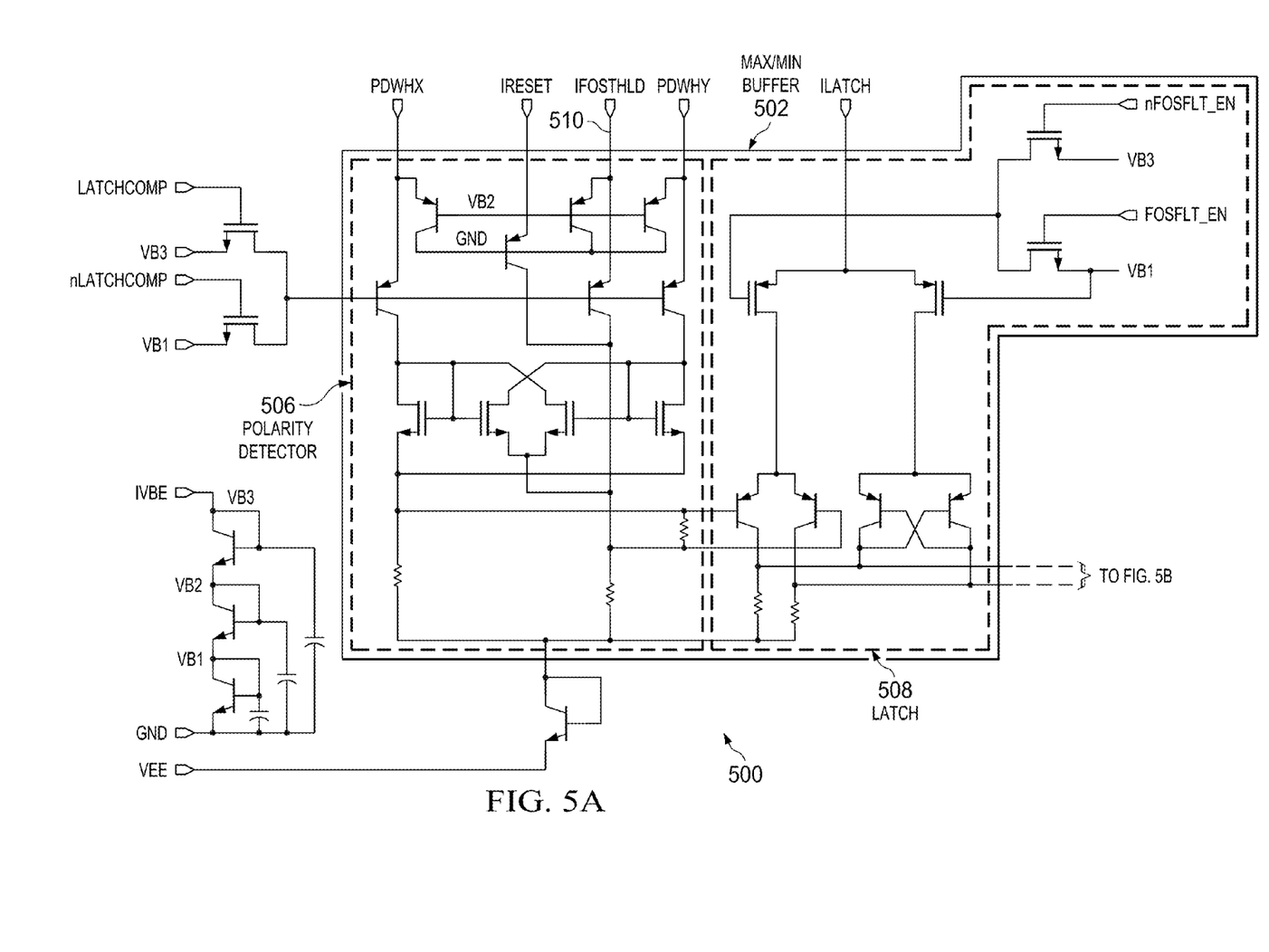
FIGS. 5A and 5B are partial views intended to form one complete view, a schematic of a portion of an example FOS fault detection circuit showing example embodiments of a max/min buffer (FIG. 5A) and an FOS fault comparator (FIG. 5B) in accordance with some embodiments of the present systems and methods.
Figure 5B:
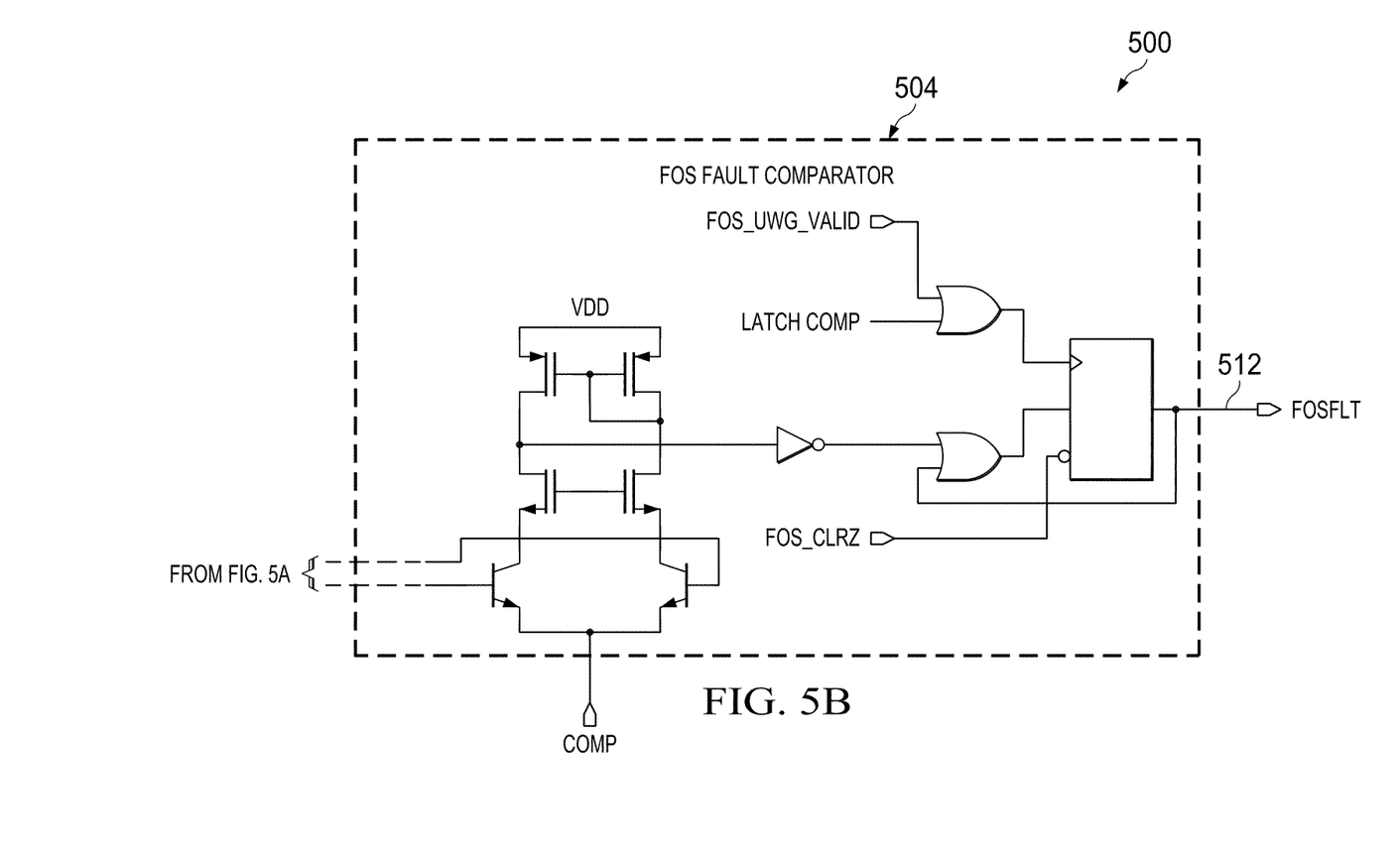

FIGS. 5A and 5B are partial views intended to form one complete view, a schematic of portion 500 of an example FOS fault detection circuit showing example embodiments of max/min buffer 502 (FIG. 5A) and FOS fault comparator 504 (FIG. 5B) such as may be implemented in an IC in accordance with some embodiments of the present systems and methods. Max/min buffer 502 may comprise min/max polarity detector 506 and buffer and latch 508. As discussed above max/min buffer 502 may be configured to detect polarity of terminals a disk drive write head and to apply a positive buffered delta to FOS fault comparator 504. FOS fault comparator 504 may be configured to compare a predetermined threshold provided via IFOSTHLD input 510 (FIG. 5A) and to output a positive or negative fault indication (FOSFLT) 512 as a digital signal (FIG. 5B).

Figure 6A:
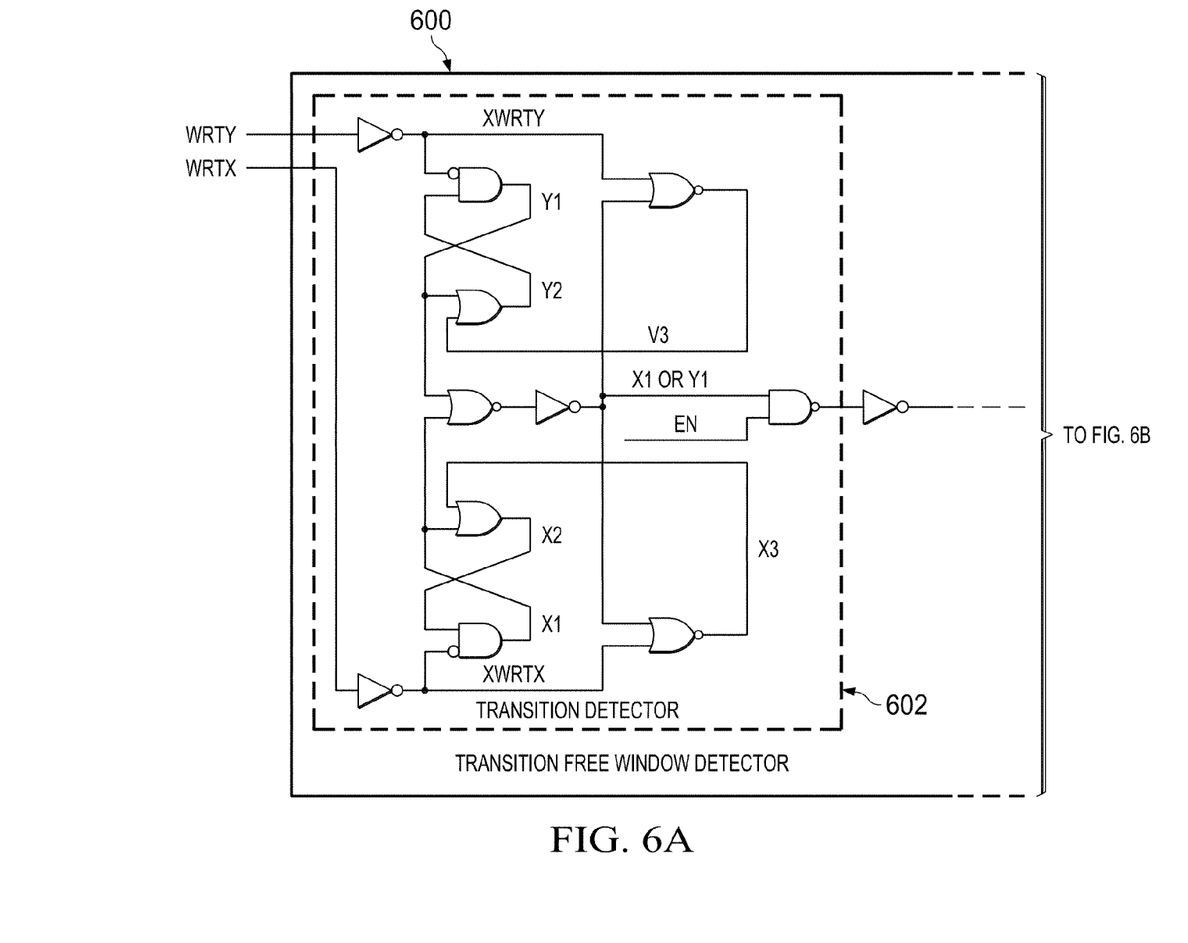
FIGS. 6A and 6B are partial views intended to form one complete view, a schematic of example FOS fault detection circuit transition-free window detector, implementing a max/min buffer and an FOS fault comparator in FIGS. 6A and 6B, respectively, in accordance with some embodiments.
Figure 6B:
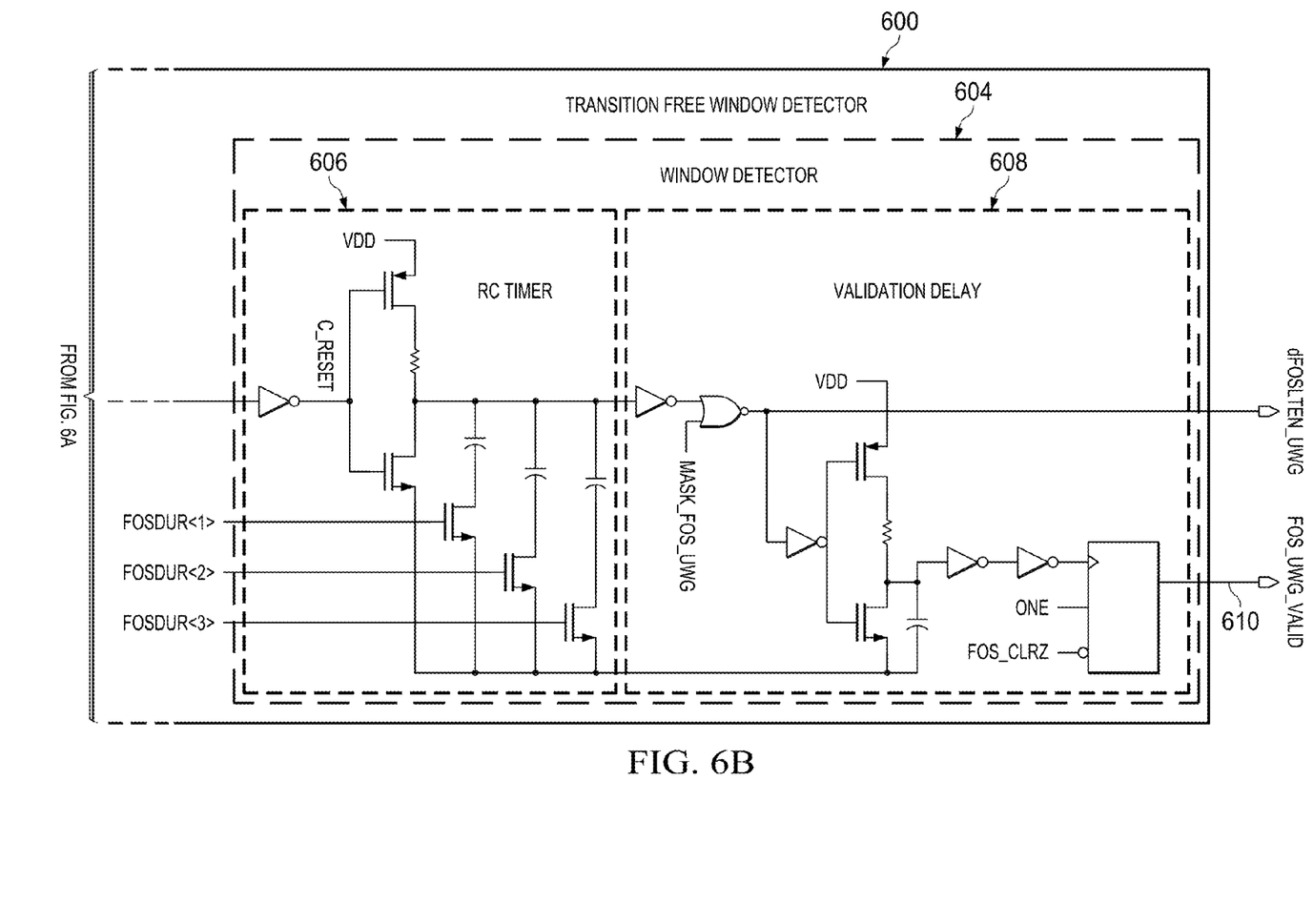

FIGS. 6A and 6B are partial views intended to form one complete view, a schematic of example FOS fault detection circuit transition-free window detector 600, such as may be implemented in an IC implementing max/min buffer 502 and FOS fault comparator 504 of FIGS. 5A and 5B (respectively) in accordance with some embodiments of the present systems and methods. The present systems and methods may use an optimized positive/negative edge detector with a balanced propagation delay to minimize transition-free data window size variations and may make use of a validated transition-free data window search function to prevent false detection. To that end, transition-free window detector 600, comprises transition detector 602 (FIG. 6A) and window detector 604 (FIG. 6B). As discussed above, transition-free window detector 600 may be configured to trigger fault comparator 504 to compare a predetermined threshold provided via a reference signal and to output a digital positive or negative fault indication when a transition-free window of zero-value bits (i.e. same-value bits) of a predetermined length is detected in a data stream from the disk drive head. Transition free window detector 600 may also be configured to provide a fault validation signal to validate output of the fault comparator in response to the detection of the transition-free window of zero-value data bits of a predetermined length. In this way any false FOS faults indicated by comparator 504 (312) may be ignored, if they occur during "non-windows" (i.e. not during a transition-free window).

Illustrated transition detector 602 (FIG. 6A) may be "equal" from input to output, in that it detects transitions in the data stream(s) regardless of whether they are from high to low, or low to high, which allows for use of a direct, sensitive, fast window detector (604), as illustrated, without loss of a transition bit separating two long zero-value bit streams, or the like. Illustrated window detector 604 (FIG. 6B) comprises a Resistor Capacitor (RC)-based timer 606 and a (fixed) validation delay 608. Every time a transition is detected by transition detector 602 RC timer 606 resets. However, if the time reaches its selected setting (i.e. a predetermined transition free window length (setting)) a valid transition-free window is indicated (610), whereupon comparator 504 (312) may be triggered and the fault validation (320) may be output.

Figure 7:
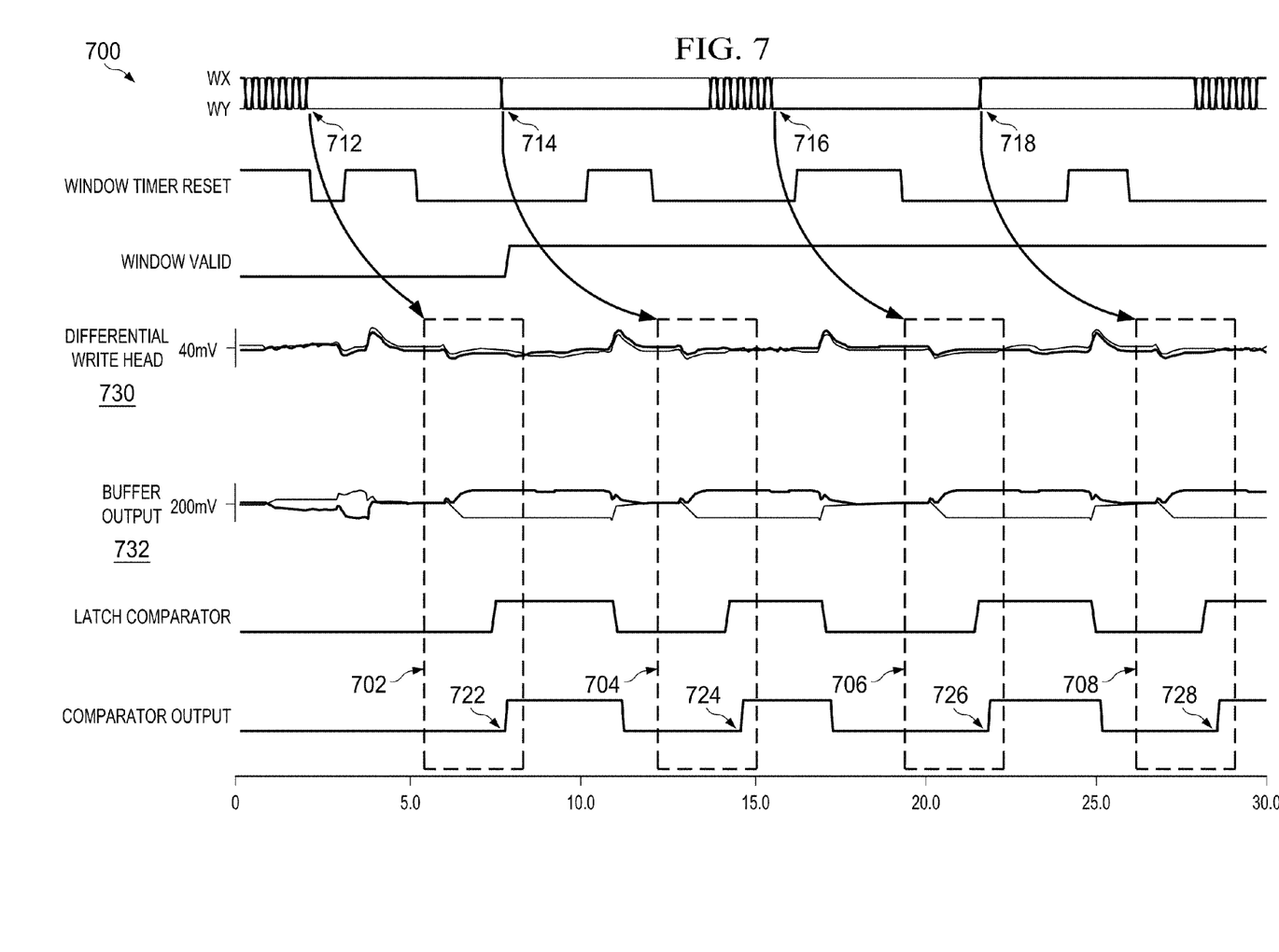
FIG. 7 is a diagrammatic plot showing FOS fault detection performed in accordance with embodiments of the present systems and methods.

FIG. 7 is a diagrammatic plot showing FOS fault detection 700 performed in accordance with embodiments of the present systems and methods. Therein, FOS fault detection is performed in windows 702, 704, 706 and 708, following (alternate) multi- and single transitions 712, 714, 716 and 718 of data, with corresponding positive comparator output shown at 722, 724, 726 and 728. That is, performance of an embodiment of the present systems and methods is shown wherein FOS fault detection is performed in window 702, following multi-transition of data at 712, with a poor FOS connection, resulting in a positive fault detection by the fault comparator, at 722. FOS fault detection is performed in window 704, following single-transition of data at 714, with a poor FOS connection and reversed write head polarity, resulting in a positive fault detection by the fault comparator, shown at 724. FOS fault detection is performed in window 706 following multi-transition of data at 716, with a poor FOS connection and reversed write head polarity, resulting in a positive fault detection by the fault comparator, shown at 726. FOS fault detection is performed in window 708 following single-transition of data at 718, with a poor FOS connection, resulting in a positive fault detection by the fault comparator, shown at 728. To enable such detection, differential write head polarity as indicated by waveform 730 is amplified to be provided by buffer output 732, consistent with write head polarity detection (at 404) discussed above and application of a positive delta representation of an absolute differential across the terminals of the write head (at 406 though 410), regardless of head polarity.

Furthermore, the present systems and methods are not limited to the above-presented implementations, but may be utilized in other environments where similar functionality may be required, such as any noisy sensing environment and/or other environments for maintaining data integrity.

Many modifications and other embodiments will come to mind to one skilled in the art to which this disclosure pertains having the benefit of the teachings presented in the foregoing descriptions, and the associated drawings. Therefore, it is to be understood that the techniques of this disclosure are not to be limited to the specific embodiments disclosed. Although specific terms are employed herein, they are used in a generic and descriptive sense only and not for purposes of limitation.

What is claimed is:

1. A method of flex over or on suspension fault detection, the method comprising:
   writing a plurality of zero-value bits as a transition-free data stream window by an idle write head of a magnetic disk drive that employs flex-over or on-suspension circuitry;
   detecting a polarity of terminals of the write head;
   generating a positive delta representation of an absolute differential across the terminals of the write head;
   measuring the positive delta representation of the absolute differential across the terminals of the write head with respect to a predetermined threshold indicative of a poor flex over or on suspension connection by a fault comparator;
   amplifying and converting a resulting measurement of the positive delta representation of the absolute differential across the terminals of the write head with respect to the predetermined absolute differential threshold indicative of a poor flex over or on suspension connection to a corresponding digital value by the fault comparator;
   triggering the fault comparator in response to detection of a transition-free window of a predetermined length;
   outputting, by the fault comparator, the digital value as a positive or negative indication of a fault in response to triggering; and
   providing a fault validation signal to validate output of the fault comparator, in response to the detection of the transition-free window of the predetermined length.

2. The method of claim 1, in which writing a plurality of zero-value bits as a transition-free data stream window by the idle write heads comprises employing run length limited data coding by the magnetic disk drive to write the plurality of zero-value bits.

3. The method of claim 1, in which the predetermined length of the transition-free window is based on a length to allow the fault comparator to settle.

4. The method of claim 1, in which the fault validation signal is provided to validate the output of the fault comparator whether the output of the fault comparator is positive or negative.

5. The method of claim 1, in which the write head is in write mode during writing the plurality of zero-value bits, detecting the polarity of the write head, generating the positive delta representation, measuring the positive delta representation with respect to the predetermined threshold, amplifying and converting the measurement, triggering the fault comparator, outputting the positive or negative indication of a fault, and providing the fault validation signal.

6. The method of claim 1, further comprising interrupting a write cycle of the write head in response to a positive indication of a fault and the fault validation signal.

7. The method of claim 1, further comprising proceeding with a media degauss of the magnetic disk drive in response to a negative indication of a fault and the fault validation signal.

8. The method of claim 1, further comprising initiating conventional writer fault detection during a next read cycle in response to failure to detect a transition-free window of a predetermined length during a write cycle.

9. A flex over or on suspension fault detection under write gate apparatus for magnetic disk drives comprising:
   a maximum-minimum buffer configured to detect a write head polarity, to generate a positive delta representation of an absolute differential across terminals of the write head using the polarity, and to apply the positive buffered delta representation to a flex over suspension fault comparator;
   the fault comparator configured to measure the positive delta representation of the absolute differential across the terminals of the write head with respect to a predetermined threshold indicative of a poor flex over or on suspension connection, to amplify and convert a resulting measurement to a corresponding digital value, and to output the digital value as a positive or negative indication of a fault; and
   a transition-free window detector configured to trigger the fault comparator to output the the fault indication when a transition-free window of zero-value data bits of a predetermined length is detected from the disk drive head, and the transition-free window detector configured to provide a fault validation signal, whether the output of the fault comparator is a positive or negative fault indication, to validate output of the fault comparator when the transition-free window of zero-value data bits of the predetermined length is detected from the disk drive head.

10. The apparatus of claim 9, in which the write head is configured to write a plurality of zero-value bits, as the transition-free window of zero-value data bits, when idle.

11. The apparatus of claim 10, in which the write head employs run length limited data coding to write the plurality of zero-value data bits as the transition-free window of zero-value data bits.

12. The apparatus of claim 9, in which the predetermined length of the transition-free window of zero-value data bits is based on a length to allow the fault comparator to settle.

13. The apparatus of claim 9, in which the maximum-minimum buffer detects the write head polarity, generates the positive delta representation and applies the positive buffered delta to the fault comparator, the fault comparator measures the positive delta representation with respect to the predetermined threshold, amplifies and converts a resulting measurement to a corresponding digital value and outputs the positive or negative indication of a fault, and the transition-free window detector triggers the fault comparator and provides the fault validation signal, while the the write head is in write mode.

14. The apparatus of claim 9, configured to permit initialization conventional writer fault detection during a next read cycle in response to failure to detect a transition-free window of a predetermined length by the transition-free window detector during a write cycle.

15. The apparatus of claim 9, in which the apparatus is at least part of an integrated circuit.

16. A magnetic disk drive comprising:
   at least one magnetic media;
   at least one write head configured to write data to the magnetic media and configured to write a plurality of zero-value bits as the transition-free window of zero-value data bits, when idle, employing run length limited data coding;
   a maximum-minimum buffer configured to detect a write head polarity, to generate a positive delta representation of an absolute differential across terminals of the write head, and to apply the positive buffered delta to a flex over suspension fault comparator;

the flex over suspension fault comparator configured to measure the positive delta representation of the absolute differential across the terminals of the write head with respect to a predetermined threshold indicative of a poor flex over or on suspension connection, to amplify and convert a resulting measurement to a corresponding digital value, and to output the digital value as a positive or negative indication of a fault; and a transition-free window detector configured to trigger the fault comparator to output the fault indication when a transition-free window of zero-value data bits of a predetermined length is detected from the disk drive head, and configured to provide a fault validation signal to validate output of the fault comparator, whether the output of the fault comparator is a positive or negative fault indication, in response to when the transition-free window of zero-value data bits of the predetermined length is detected from the disk drive head.

17. The magnetic disc drive of claim 16, in which the predetermined length of the transition-free window of zero-value data bits is based on a length to allow the fault comparator to settle.

18. The magnetic disc drive of claim 16, in which the maximum-minimum buffer detects the write head polarity, generates the positive delta representation and applies the positive buffered delta to the fault comparator, the fault comparator measures the positive delta representation with respect to the predetermined threshold, amplifies and converts a resulting measurement to a corresponding digital value and outputs the positive or negative indication of a fault, and the transition-free window detector triggers the fault comparator and provides the fault validation signal, while the magnetic disk drive or the at least one write head is in write mode.

19. The magnetic disc drive of claim 16, in which the magnetic disk drive initiates conventional writer fault detection during a next read cycle, in response to failure to detect a transition-free window of a predetermined length during a write cycle.

20. The magnetic disc drive of claim 16, in which at least the maximum-minimum buffer, the flex over suspension fault comparator and the transition-free window detector are part of an integrated circuit.

* * * * *